United States Patent

[11] 3,576,497

[72] Inventor Samuel A. Miller
 China Lake, Calif.
[21] Appl. No. 775,067
[22] Filed Nov. 12, 1968
[45] Patented Apr. 27, 1971
[73] Assignee The United States of America as represented by the Secretary of the Navy

[54] COINCIDENCE DETECTOR AND SEPARATOR FOR A COUNTER
9 Claims, 2 Drawing Figs.
[52] U.S. Cl. ................................................ 328/109, 307/222, 328/155
[51] Int. Cl. ................................................ H03k 5/20
[50] Field of Search .......................................... 328/109, 134, 155, 44; 307/232, 222, 295, 278; 329/137

[56] References Cited
UNITED STATES PATENTS
3,327,226 6/1967 Nourney.................... 328/109
3,441,342 4/1969 Ball et al.................... 328/155X Primary Examiner—Stanley T. Krawczewicz
Attorneys—Edgar J. Brower and Roy Miller ABSTRACT: A device which permits a pulse triggered counter to accept pulse trains from one or more inputs where the pulses arriving at the inputs may be time domain coincident, which is the occurrence of two pulses within a specified time interval. The device delays one of the simultaneous pulses in time to permit it to be counted at a later time.

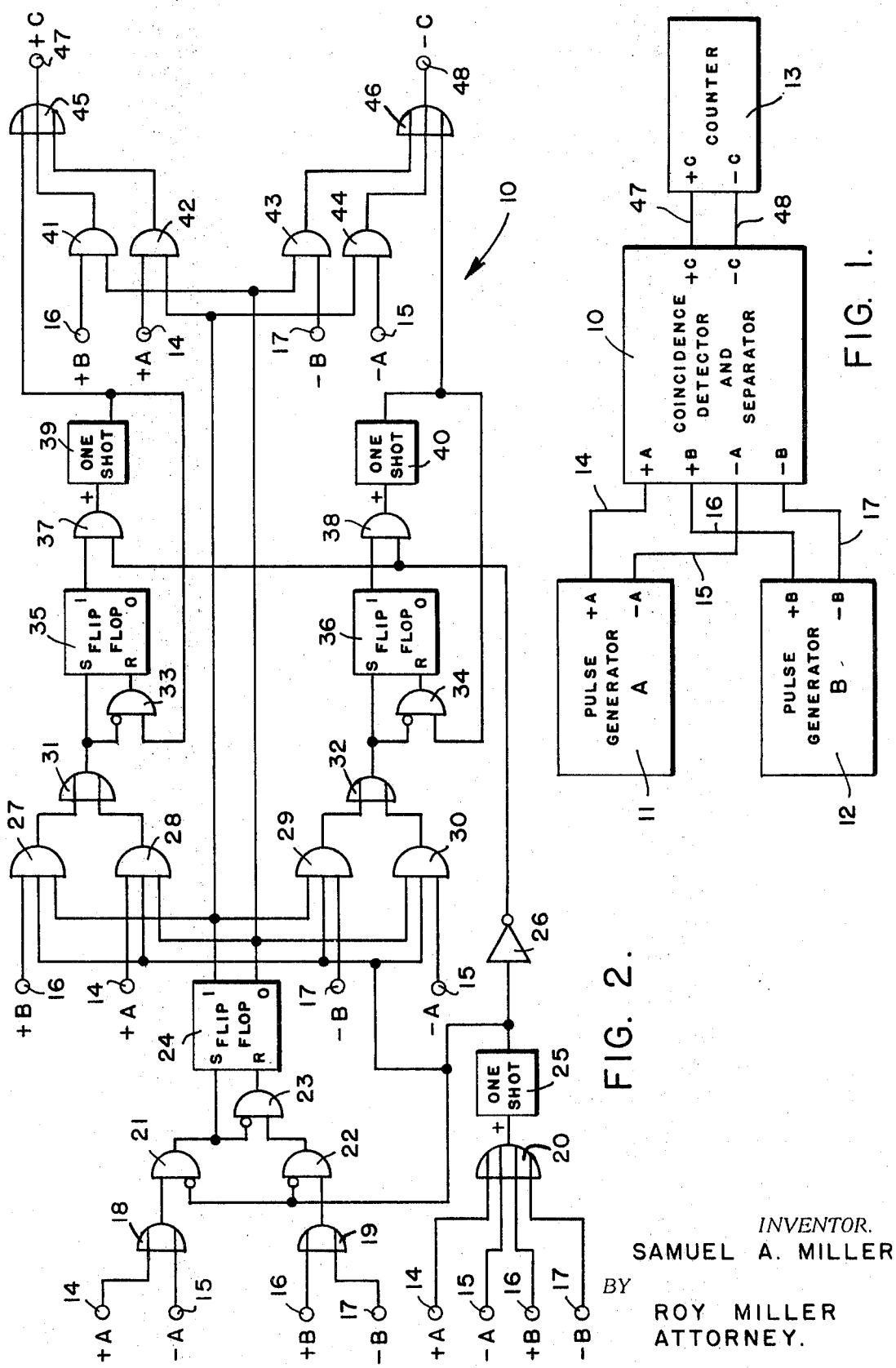

COINCIDENCE DETECTOR AND SEPARATOR FOR A COUNTER

BACKGROUND OF THE INVENTION

It is desirable to have an interface between a source or sources which output asynchronous digital information and an up-down counter. In general, a counter will not count two or more pulses correctly if they arrive at the input within a certain specified time interval, which time interval is peculiar to the particular counter being used.

If the positive pulses from the source or sources are logically OR'ed together and applied to the positive input of a counter and if the negative pulses from the source or sources are logically OR'ed together and applied to the negative input of the counter, then the counter will correctly count the pulses from the pulse source or sources unless the inputs from one or any source are coincident. For instance, if the positive pulses arrive in coincidence at the input of the OR gate which operates the positive input of an up-down counter, the counter will advance only one count instead of the desired two counts.

SUMMARY OF THE INVENTION

In accordance with the present invention, if a positive pulse from one source is coincident with a positive pulse from the same source or a second source, one of the two pulses is gated through to the positive input to a counter. The other pulse is inhibited and causes a delayed pulse to be generated on the positive input to the counter after a preselected period of time. The pulse which is gated through directly is the pulse which arrives at the input to the device first. In the case of exact coincidence the device makes a choice between the two.

If a positive pulse from one source is coincident with a negative pulse from the other source, then one of the two pulses is gated through directly to its respective input terminal on the counter. The other pulse is inhibited and causes a delayed pulse to be generated at the input of opposite polarity on the counter at the end of the preselected period of time.

BRIEF DESCRIPTION OF THE DRAWING

FIG. 1 is a block diagram showing the use of the device with two pulse generators and a counter; and FIG. 2 is a block diagram of a preferred embodiment of the device.

DESCRIPTION OF THE PREFERRED EMBODIMENTS

FIG. 1 shows a coincidence detector and separator 10 receiving pulse train A from pulse generator 11 and pulse train B from pulse generator 12. The positive pulses from pulse generator 11, +A, are carried via terminal and line 14 to coincidence detector and separator 10. Similarly, —A pulses are carried to coincidence detector and separator 10 via line 15, +B pulses are carried via line 16 and —B pulses are carried via line 17. The outputs of coincidence detector and separator 10, +C and —C, are carried to an up-down counter 13 via lines 47 and 48, respectively.

For purposes of separating coincident pulses it is assumed that a +A pulse into input terminal 14 and a —A pulse into input terminal 15 will never be coincident or arrive within a preselected "forbidden time" as established by the time constant of one-shot monostable multivibrator 25. Similarly, a +B pulse into input terminal 16 and a —B pulse into input terminal 17 will never be coincident or recur within the forbidden time. All other combinations are possible, except any two identical pulses may not recur within the forbidden time.

Referring to FIG. 2, assume a +A pulse arrives at terminal 14 and there are no other pulses. If flip-flop 24 is reset, the +A pulse will pass through OR gate 18 and enabled AND gate 21 to set flip-flop 24. If flip-flop 24 is already set, the +A pulse passing through OR gate 18 and enabled AND gate 21 is superfluous. AND gate 23 prohibits a +B pulse from resetting flip-flop 24 if a +A and +B pulse arrive at the entrance to AND gate 23 simultaneously.

AND gates 21 and 22 are disabled by the output from one-shot monostable multivibrator 25 which is triggered by the +A input pulse which passes through OR gate 20. The time during which there is an output from one-shot monostable multivibrator 25 is called the "forbidden time." A pulse arriving at any input terminal during this forbidden time is prevented from causing flip-flop 24 to change states because AND gates 21 and 22 are disabled.

The setting of flip-flop 24 enables AND gates 42 and 44. The +A pulse into terminal 14 will exit through OR gate 45 to output terminal 47. Similarly, a —A pulse into input terminal 15 will set flip-flop 24, AND gate 44 will be enabled, and the —A pulse will exit through OR gate 46 to output terminal 48.

A +B pulse into input terminal 16 will pass through OR gate 19, enable AND gate 22, and enable AND gate 23 to reset flip-flop 24. The +B pulse simultaneously passes through OR gate 20 to actuate one-shot monostable multivibrator 25 which disables AND gates 21 and 22 for the time constant of the one-shot monostable multivibrator, i.e. the forbidden time. The disablement of AND gates 21 and 22 prevents flip-flop 24 from changing states during the forbidden time. Similarly, a —B pulse into input terminal 17 will pass through OR gate 19, and enable AND gates 22 and 23 to reset flip-flop 24. The —B pulse simultaneously passes through OR gate 20 to actuate one-shot monostable multivibrator 25 which disables AND gates 21 and 22 for the forbidden time.

Assume that a +A pulse into input terminal 14 has passed through OR gate 18 and AND gate 21 to set flip-flop 24, and simultaneously has passed through OR gate 20 to activate one-shot monostable multivibrator 25 thus disabling AND gates 21 and 22. The output of one-shot monostable multivibrator 25 is high and equal to logical ONE.

Further assume that within the time constant of one-shot monostable multivibrator 25, the forbidden time, a +B pulse enters input terminal 16. The outputs of flip-flop 24 and one-shot monostable multivibrator 25 in combination will enable AND gates 27 and 29. The appearance of the +B pulse on input terminal 16 will set flip-flop 35 via OR gate 31. The output of flip-flop 35 in turn enables AND gate 37. Since the pulse outputted from one-shot monostable multivibrator 25 is inverted by inverter 26, at the end of the forbidden time period when one-shot monostable multivibrator 25 returns to logical ZERO, the inverted pulse goes upward from logical ZERO to logical ONE. The upward change of logical state triggers one-shot monostable multivibrator 39 through enabled AND gate 37. The output of one-shot monostable multivibrator 39 is short to give the appearance of a pulse which passes through OR gate 45 to output terminal 47. Thus, the +B pulse arriving at input terminal 16 during the forbidden time is "delayed" and "arrives" at output terminal 47 at the end of the forbidden time.

The output of one-shot monostable multivibrator 39 is fed back to AND gate 33 which is enabled by the absence of a signal on the other input terminal so that the output pulse from one-shot monostable multivibrator 39 resets flip-flop 35.

If, during the period when the output of one-shot monostable multivibrator 39 is high, and is outputting a pulse, a +A or +B pulse enters the system, disabled AND gate 33 ensures that flip-flop 35 remains set and cannot be reset so that another "artificial pulse" can be generated at the end of the following forbidden time period.

The "artificial pulse" generated by the +A or +B pulse entering the system during the period when one-shot monostable multivibrator 39 is high, triggers one-shot monostable multivibrator 25 and activates inverter 26. Since, during the time when one-shot monostable multivibrator 25 is high the output of inverter 26 is low, at the end of the forbidden time domain the output of one-shot monostable multivibrator drops and the output of inverter 26 rises. The rise in the output of inverter 26 triggers one-shot monostable multivibrator 39 via enabled AND gate 37 to produce a delayed pulse at output terminal 47 through OR gate 45.

Assume that a −A pulse has entered input terminal 15 and has been outputted at terminal 48. Flip-flop 24 is set and AND gates 21 and 22 are disabled. The output of one-shot monostable multivibrator 25 is high or equal to logical ONE.

Further assume that a −B pulse enters input terminal 17. Flip-flop 24 and one-shot monostable multivibrator 25 in combination enable AND gates 27 and 29. The appearance of the −B pulse will set flip-flop 36 via OR gate 32 enabling AND gate 38. Since the pulse outputted from one-shot monostable multivibrator 25 is inverted by inverter 26, at the end of the forbidden time when one-shot monostable multivibrator 25 returns to logical ZERO, the inverter pulse outputted by inverter 26 shifts upward from logical ZERO to logical ONE. The upward change of logical state triggers one-shot monostable multivibrator 40 through enabled AND gate 38.

The output of one-shot monostable multivibrator 40 is short to create an "artificial pulse" which passes through OR gate 46 to output terminal 48.

The output of one-shot monostable multivibrator 40 is fed back to AND gate 34 which is enabled by the absence of a signal on the other input terminal so that this output pulse resets flip-flop 36.

If, during the period when the output of one-shot monostable multivibrator 40 is high, and outputting a pulse, a −A or −B pulse enters the system, disabled AND gate 34 ensures that flip-flop 36 remains set and cannot be reset so that another "artificial pulse" can be generated at the end of the following forbidden time period.

The "artificial pulse" is generated when one-shot monostable multivibrator 25 turns off at the end of the forbidden time period and the inverted output from inverter 26 rises to fire one-shot monostable multivibrator 40 through enabled AND gate 38 so that the output arrives at output terminal 48 through OR gate 46.

If a +B pulse enters terminal 16, flip-flop 24 is reset via OR gate 19 and AND gates 22 and 23. One-shot monostable multivibrator 25 is simultaneously triggered by the +B pulse on terminal 16 through OR gate 20. The output of one-shot monostable multivibrator 25 disables AND gates 21 and 22 so that flip-flop 24 cannot change states during the forbidden time period.

Flip-flop 24 enables AND gates 41 and 43 so that the +B pulse can be outputted to terminal 47 via OR gate 45.

When a +A pulse enters input terminal 14 during the forbidden time period, after the entry of a +B pulse onto terminal 16, it passes through AND gate 28 which is enabled by the combination of the outputs from flip-flop 24 and one-shot monostable multivibrator 25. The +A pulse passes through AND gate 28 to OR gate 31 to set flip-flop 35 which enables AND gate 37.

When one-shot monostable multivibrator 25 changes state from logical ONE to logical ZERO at the end of the forbidden time period the output of inverter 26 changes state upward from logical ZERO to logical ONE. The upward change perceived at AND gate 37 fires one-shot monostable multivibrator 39 which outputs an "artificial" pulse via OR gate 45 to output terminal 47.

If a −B pulse enters terminal 17, monostable multivibrator 25 is simultaneously triggered via OR gate 20, and flip-flop 24 is reset via OR gate 19 and AND gates 22 and 23. During the forbidden time period one-shot monostable multivibrator 25 is high thus disabling AND gates 21 and 22 so that flip-flop 24 cannot change states.

Flip-flop 24 enables AND gates 41 and 43 so that the −B pulse can be outputted to terminal 48 via OR gate 46.

When a −A pulse enters input terminal 15 during the forbidden time period after the entry of a −B pulse onto terminal 17 it passes through AND gate 30 which is enabled by the combination of the outputs from flip-flop 24 and one-shot monostable multivibrator 25.

The −A pulse passes through enabled AND gate 30 and OR gate 32 to set flip-flop 36, which in turn enables one-shot monostable multivibrator 40. When the output of one-shot monostable multivibrator 25 drops from logical ONE to logical ZERO at the end of the forbidden time period, the output of inverter 26 rises from logical ZERO to logical ONE thus triggering one-shot monostable multivibrator 40 via enabled AND gate 38. The "artificial" pulse outputted by one-shot monostable multivibrator 40 appears at output terminal 48 passing through OR gate 46.

The resetting of flip-flops 35 and 36 after the passage of the "artificial pulse" is accomplished as described above.

If either a ±A pulse or a ±B pulse arrives at the input to terminals 14 and 15 or 16 and 17 simultaneously, flip-flop 24 will always be set by the ±A pulse rather than reset by the ±B pulse because the ±B pulse is inhibited from flip-flop 24 by disabled AND gate 23. A +A pulse will be gated through enabled AND gate 42 and OR gate 45 to output terminal 47. A −A pulse will be gated through enabled AND gate 44 and OR gate 46 to output terminal 48. At the end of the first cycle through one forbidden time period, the output of one-shot monostable multivibrator 25 will shift from logical ONE to logical ZERO causing a shift from logical ZERO to logical ONE at the output of inverter 26. If the simultaneous B pulse is positive, flip-flop 35 will be set and AND gate 37 will be enabled. Thus one-shot monostable multivibrator 39 will output an "artificial pulse" via OR gate 45 to output terminal 47. If the simultaneous B pulse is negative, flip-flop 36 will be set and AND gate 38 will be enabled. Thus one-shot monostable multivibrator 40 will output an "artificial pulse" to output terminal 48 via OR gate 46.

I claim:

1. An apparatus which permits a pulse triggered device to accept pulse trains having a pulse repetition frequency greater than the pulse repetition frequency of the device comprising:
   input means adapted to receive more than two pulse trains;
   detection means to determine when pulses arrive at the input means;
   gating means to pass through to said pulse triggered device the first pulse in a series of pulses occurring during a predetermined period of time corresponding to the pulse repetition frequency of the pulse triggered device which time is called the "forbidden time;"
   pulse storage means to store pulses arriving at the input means after the first pulse and during the "forbidden time;"
   "artificial pulse" generating means; and
   triggering means responsive to said pulse detection means to cause the "artificial pulse" generating means to output a pulse corresponding to the pulses stored in said pulse storage means.

2. The apparatus as described in claim 1 wherein the input means adapted to receive more than two pulse trains comprises:
   a first input terminal; and
   a second input terminal.

3. The apparatus as described in claim 2 wherein the detection means comprises:
   a first flip-flop capable of being set and reset wherein:
      the flip-flop is set in response to a pulse entering the first input terminal, and
      the flip-flop is reset in response to a pulse entering the second input terminal.

4. The apparatus as described in claim 3 wherein the gating means to pass through to said pulse triggered device comprises:
   a first AND gate which is enabled by a logical ONE generated by the first flip-flop while in the SET position so that a first pulse entering the first input terminal will pass through to the pulse triggered device; and
   a second AND gate which is enabled by a logical ONE generated by the first flip-flop while in the RESET position so that if a first pulse enters the second input terminal it will pass through to said pulse triggered device.

5. The apparatus as described in claim 4 wherein the pulse storage means comprises:
   a first one-shot monostable multivibrator:

which triggers upon receipt of a pulse into either the first input terminal OR the second input terminal, and
having a time constant equal to the "forbidden time;"
means for preventing resetting of the first flip-flop during the forbidden time;
a third AND gate logically connected to the second input terminal and which is enabled by the combination of:
an output from said first one-shot monostable multivibrator, and
a logical ONE generated by the first flip-flop while in the SET position; and
a fourth AND gate logically connected to the first input terminal and which is enabled by the combination of:
an output from said first one-shot monostable multivibrator, and
a logical ONE generated by the first flip-flop while in the RESET position.

6. The apparatus as described in claim 5 wherein the means for preventing resetting of the first flip-flop during the forbidden time comprises:
a first inhibited AND gate logically connected to the SET terminal of said first flip-flop;
a second inhibited AND gate logically connected to the RESET terminal of said first flip-flop; and
the first and second inhibited AND gates are disabled during the "forbidden time" where there is an output from the first one-shot monostable multivibrator; so that
pulses entering the first and second input terminals cannot set or reset, respectively, the first flip-flop during the "forbidden time."

7. The apparatus as described in claim 5 wherein the "artificial pulse" generating means comprises:

a second flip-flop capable of being set and reset wherein the flip-flop is set by either:
a second pulse occurring during the "forbidden time" and passing through the third AND gate, or
a second pulse occurring during the "forbidden time" and passing through the fourth AND gate; and
a fifth AND gate which is enabled by a logical ONE generated by the second flip-flop while in the SET position.

8. The apparatus as described in claim 7 wherein the triggering means responsive to said pulse detection means comprises:
a second one-shot monostable multivibrator:
logically connected to said pulse triggered device,
having a "pulselike" output, and
which triggers upon receipt of the trailing edge of the inverted output of the first one-shot monostable multivibrator via said fifth AND gate; and
means for resetting said second flip-flop.

9. The apparatus as described in claim 8 wherein the means for resetting the second flip-flop comprises:
a third inhibited AND gate logically connected to the reset terminal of the second flip-flop;
the third inhibited AND gate is disabled to prevent a pulse occurring during the "forbidden time" and subsequent to the setting pulse from resetting the second flip-flop, and
the second flip-flop is reset by the output of the second one-shot monostable multivibrator which passes through the third inhibited AND gate which is enabled for this purpose.